M. N. JOHNSON.
FEED TROUGH.
APPLICATION FILED JAN. 6, 1916.
1,228,929.
Patented June 5, 1917.
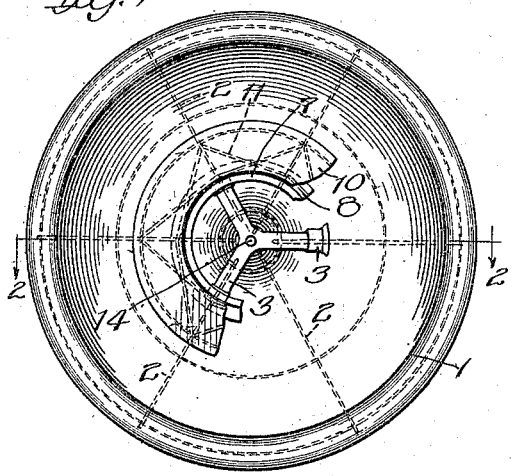
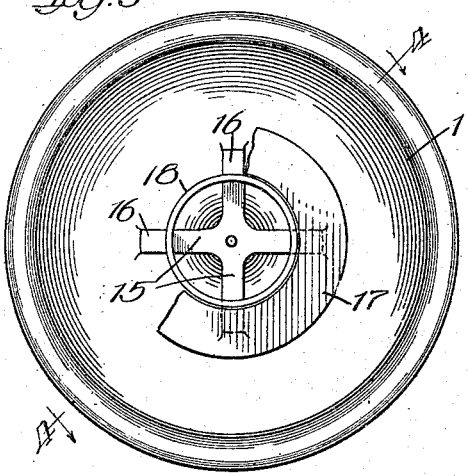
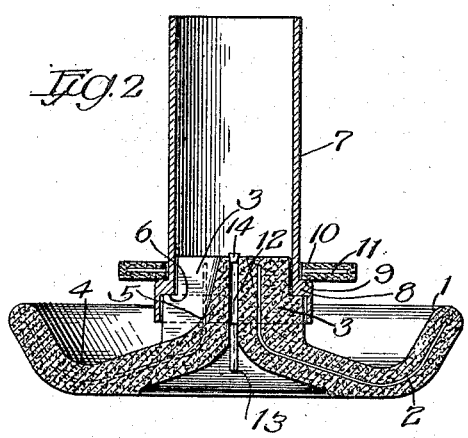
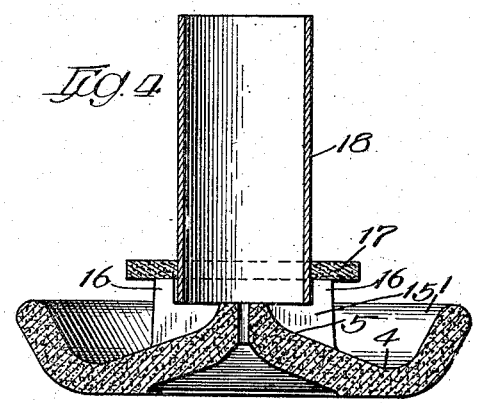
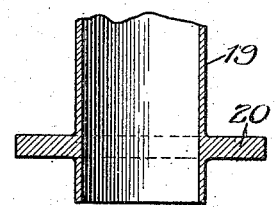
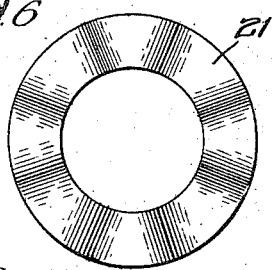
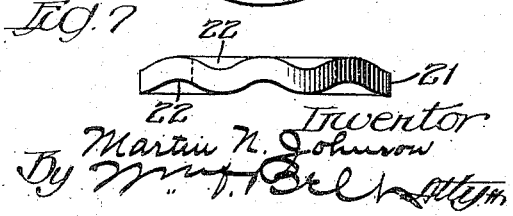
Inventor
Martin N. Johnson

UNITED STATES PATENT OFFICE.

MARTIN N. JOHNSON, OF MOLINE, ILLINOIS.

FEED-TROUGH.

1,228,929.  Specification of Letters Patent.  Patented June 5, 1917.

Application filed January 6, 1916. Serial No. 70,583.

*To all whom it may concern:*

Be it known that I, MARTIN N. JOHNSON, a citizen of the United States, residing at Moline, in the county of Rock Island and State of Illinois, have invented certain new and useful Improvements in Feed-Troughs, of which the following is a specification.

This invention relates to a feed trough for animals, fowl and the like and has for its object the provision of a feed trough of substantial character to contain a quantity of feed in such a manner that it can not be scattered, and of which the parts may be readily separated for cleaning and as readily reassembled.

A further object of my invention is the provision in a feed trough of means for preventing animals from placing their feet therein while eating.

A still further object of my invention is the provision of a feed trough combining the above-described advantages and comprising a minimum number of simple and inexpensive parts which are not liable to be readily broken or otherwise rendered unfit for use and which, therefore, will be serviceable indefinitely.

Other objects and advantages of my invention will be apparent as it is better understood by reference to the following specification when read in connection with the accompanying drawing, illustrating the preferred embodiments thereof, in which—

Figure 1 is a plan view of my invention, with parts broken away;

Fig. 2 is a vertical section on the line 2—2 of Fig. 1;

Fig. 3 is a plan view of a slightly different form of my invention with parts broken away;

Fig. 4 is a vertical section on the line 4—4 of Fig. 3;

Fig. 5 is a vertical section of a portion of a magazine with the guard ring formed integral therewith, and Figs. 6 and 7 are a plan view and side elevation, respectively, of a slightly different form of guard ring adapted for use with the structures illustrated in Figs. 1 to 4.

Referring to Figs. 1 and 2 of the drawing, 1 indicates a circular feed trough which may be made of any suitable material but which is illustrated as constructed of concrete reinforced by a wire cage 2. The trough 1 is provided with a plurality of integral supporting members 3 extending radially from the center thereof and the bottom 4 of the trough is sloped upwardly at 5 between the supporting members 3 to form inclined chutes. Supported on the shoulders 6 of the supporting members 3 is a cylindrical magazine 7 open at both ends and preferably provided with a bell 8 which engages the shoulders 6 of the supporting members 3. The magazine 7 may be of any suitable material but is preferably a section of sewer tile, which is inexpensive and readily obtainable. Surrounding the magazine 7 and supported by the shoulder 9 formed by the bell 8 is a guard ring 10 which overhangs the trough 1 and is vertically spaced therefrom a sufficient distance to allow animals to feed from the trough 1, the ring 10 preventing them, however, from feeding while standing in the trough. The ring 10 may be constructed of concrete reinforced with the wire 11. An opening 12 extends vertically through the trough 1, centrally thereof, to receive a pipe 13 leading from a source of water supply whereby water may be mixed with the feed in the trough and a plug 14 is provided which may be inserted in the end of the opening 12 when no water is to be admitted.

My invention is utilized by placing the feed, which may be dry or moist, in the magazine 7, from which it descends as required into the trough 1 between the supporting members 3, the inclined chute 5 aiding in this operation. The animals to be fed have ready access to the feed in the trough 1 but are prevented from feeding while standing in the trough so that contamination of the feed is prevented. It will be readily understood that the parts of my improved feed trough may be readily separated for cleaning and subsequently reassembled and that when constructed of the materials named the device will be practically indestructible. It is to be understood, however, that various materials, such for example as iron or clay products, may be employed, my invention being in no way limited to the use of the specific materials described.

Referring to Figs. 3 and 4 of the drawing, the device illustrated is identical with that previously described, except that the radially disposed supporting members 15 are provided with upstanding portions 16 upon which the guard ring 17 rests. The magazine 18 comprises a cylindrical member open at both ends and without the previously described bell, and is adapted to rest on the supporting members 15. The manner of use is identical with that previously described.

Referring to Fig. 5, the magazine 19 is illustrated as provided with an integral guard ring 20, replacing the separable rings 11 and 17 previously described. The magazine 19 may be substituted for either of the magazines 7 or 18.

Referring to Figs. 6 and 7, 21 illustrates a guard ring, having undulating surfaces 22, which may be substituted for the rings 10 or 17 previously described. Where the ring 21 is employed it may be spaced from the trough 1 a distance slightly less than is possible with a flat ring because of the undulations thereon.

It will be apparent that various changes may be made in the form, construction and arrangement of the parts without departing from the spirit and scope of the invention or sacrificing any of its material advantages, the forms hereinbefore described being merely preferred embodiments thereof.

I claim:

1. In a device of the character described, the combination of a circular trough of concrete having an upwardly projecting axial portion provided with a plurality of radially projecting wings integral therewith and forming with said axial portion a plurality of chutes, a hollow magazine supported on said wings and a guard ring supported above and extending above said trough.

2. In a device of the character described, the combination of a circular trough of concrete having an integral upwardly projecting axial portion provided with a plurality of radially projecting wings, a hollow magazine supported on said wings, a guard ring supported above and extending over said trough, an axial opening in said upwardly projecting portion, and a pipe connected to said axial opening.

MARTIN N. JOHNSON.

Witnesses:
ALVINA C. JOHNSON,
EMANUEL M. LETHIN.

Copies of this patent may be obtained for five cents each, by addressing the "Commissioner of Patents, Washington, D. C."